US012729268B2

(12) United States Patent
Venturini Del Greco et al.

(10) Patent No.: US 12,729,268 B2
(45) Date of Patent: Sep. 8, 2026

(54) FORMALDEHYDE-FREE BINDERS AND METHODS FOR PRODUCING THE SAME

(71) Applicant: AGROILS TECHNOLOGIES S.P.A., Florence (IT)

(72) Inventors: Giovanni Venturini Del Greco, Florence (IT); Arjen Harm Van Veen, Florence (IT); Andrea Comparini, Florence (IT); Jacopo Rosselli Del Turco, Impruneta (IT)

(73) Assignee: COLLIX S.R.L., Florence (IT)

( * ) Notice: Subject to any disclaimer, the term of this patent is extended or adjusted under 35 U.S.C. 154(b) by 1221 days.

(21) Appl. No.: 17/625,785

(22) PCT Filed: Jul. 15, 2020

(86) PCT No.: PCT/EP2020/069975
§ 371 (c)(1),
(2) Date: Jan. 10, 2022

(87) PCT Pub. No.: WO2021/009210
PCT Pub. Date: Jan. 21, 2021

(65) Prior Publication Data

US 2022/0348710 A1 Nov. 3, 2022

(30) Foreign Application Priority Data

Jul. 15, 2019 (IT) ........................ 102019000011805
Aug. 8, 2019 (IT) ........................ 102019000014370

(51) Int. Cl.
*C09J 199/00* (2006.01)
*C08G 18/64* (2006.01)

(52) U.S. Cl.
CPC ........ *C08G 18/6492* (2013.01); *C09J 199/00* (2013.01)

(58) Field of Classification Search
CPC ............. C08G 18/6492; C08G 18/7664; C09J 199/00; C08L 99/00
See application file for complete search history.

(56) References Cited

U.S. PATENT DOCUMENTS

2020/0198176 A1* 6/2020 Tu ...................... C08G 18/4277

FOREIGN PATENT DOCUMENTS

| | | | | |
|---|---|---|---|---|
| CN | 103952117 B | 6/2016 | | |
| CN | 105861379 B | 3/2019 | | |
| GB | 2524462 A | 9/2015 | | |
| WO | 2015196134 A1 | 12/2015 | | |
| WO | WO-2017055555 A1 * | 4/2017 | ................ | A23J 3/14 |

OTHER PUBLICATIONS

Search Report and Written Opinion of PCT/EP2020/069975 of Oct. 7, 2020.

* cited by examiner

*Primary Examiner* — Jiangtian Xu
(74) *Attorney, Agent, or Firm* — Silvia Salvadori, P.C.; Silvia Salvadori

(57) ABSTRACT

The present invention concerns the field of binders suitable for wood panel manufacturing. In particular, the invention regards methods for producing bio-based formaldehyde-free binders. In a further aspect the present invention describes bio-based formaldehyde-free binders obtainable from the described methods and their uses. The invention further describes methods for gluing articles and formaldehyde-free products obtainable from the methods of the present invention.

16 Claims, No Drawings

FORMALDEHYDE-FREE BINDERS AND METHODS FOR PRODUCING THE SAME

This application is a U.S. national stage of PCT/EP2020/069975 filed on 15 Jul. 2020, which claims priority to and the benefit of Italian Patent Application No. 102019000011805 filed on 15 Jun. 2019 and which claims priority to and the benefit of Italian Patent Application No. 102019000014370 filed on 8 Aug. 2019, the contents of which are incorporated herein by reference in their entireties.

FIELD OF THE INVENTION

The present invention concerns the field of binders suitable for wood panel manufacturing. In particular, the invention regards methods for producing bio-based formaldehyde-free binders. In a further aspect the present invention describes bio-based formaldehyde-free binders obtainable from the described methods and their uses.

The invention further describes methods for gluing articles and formaldehyde-free products obtainable from the methods of the present invention.

STATE OF THE ART

Most of the wood panels manufactured for interior purposes, i.e. medium density fibreboard, oriented strand board, particleboard and plywood, are made with binders comprising formaldehyde, a volatile toxic chemical compound, that is known by WHO International Agency for Research on Cancer (IARC) (2010) and the EuCIA (2015) to be a human carcinogenic compromising indoor air quality. To mitigate the adverse effect on indoor air quality, the Airborne Toxic Control Measure was effectuated to provide special provisions for manufacturers of wood panels who plan to utilise replacement binders that do not contain any formaldehyde, also known as No-Added-Formaldehyde (NAF) binders. Polymeric methylene diphenyl diisocyanate (pMDI) is such a NAF binder, known to provide excellent adhesion at relatively low dosage onto the fibres compared to other binder systems.

For the manufacturing of oriented strand board pMDI is particularly advantageous. However, the uptake of pMDI in other wood panel manufacturing processes is limited due to some inherent disadvantages.

First, pMDI can be adsorbed by the porous surface of wood compromising the coverage of pMDI over the lignocellulosic substrates. Increased pMDI usage can overcome problems related to binder coverage, however doing so will affect unit volume price of the manufactured panels compromising its competitiveness with formaldehyde-based products.

Second, pMDI also sticks to the metal press platens, caul plates or stainless-steel screens that are used in the manufacturing process of wood panels. Consequently, manufacturers of wood panels are concerned about press build-up that can compromise the continuity of their manufacturing processes due to potentially extensive maintenance. To deal with such issue, extensive use of expensive, fossil-based or non-biodegradable releasing agents has been attempted and press-line modifications can be required.

Third, pMDI is a petrochemically derived compound of which its Global Warming Potential (GWP) is estimated to be similar to that of MDI being 2.4 kg $CO_2$ equivalent per kg of MDI, as described by Plastics Europe (2012), and thus does not contribute to mitigating climate change.

To overcome some of these challenges when manufacturing fibreboard panels with pMDI, biological material possessing well-known binding properties, such as protein, can be utilised by mixing them with pMDI to obtain a more cost-effective and green binder. This combination of petrochemical-derived pMDI with biological binder ingredients results in a bio-based formaldehyde-free binder. Such bio-based binders often comprise fractions derived from the refining of edible crops, such as concentrated or isolated soy protein.

Patent EP2576661 and WO2012112734 describe methods to obtain stable emulsions by mixing defatted oilseed meals with a reactive prepolymer, such as pMDI or PAE, for the manufacturing of lignocellulosic fibreboards. Patent EP2576661 prefers to isolate the protein constituent of the oilseed meal, thus eliminating the lipid and soluble constituents, from the desired protein product, prior to mixing it with the reactive prepolymer pMDI. The described method puts in evidence that significant additivation is required when using ground plant meal-based formulations, such as urea and waxes, to obtain the right viscosity and binder solid content while rendering a sprayable binder used to manufacture moisture resistant composites. Furthermore, in the particular case for fibreboard panels, EP2576661 put in evidence that the stable emulsions cannot provide for panel release from metal press platens unless considering extensive additivation with composite release promoters, such as a functionalised silicone fluid. Patent application WO2017055557 describes binder compositions comprising ground plants containing proteins, maltodextrin and silicone. Further described is a method of using ground plants containing proteins in binder applications where plant meals are preferred with a protein content of between 20% and 50% and oil content of no more than 1 to 4% by weight of the total dry weight of the plant meal. Plant meals with an oil content of up to 4% are preferred for binder applications. Benefits in addressing lack of panel release from press metal platens are not considered.

Patent WO2019000103 describes a method of utilizing an engineered bio-polymer with one or more monomers or oligomers having an average degree of polymerization of 4 or less in combination with an isocyanate to manufacture fibreboard panels. The patent addresses a shortcoming of patent application WO2016101063, i.e. not providing sufficient tack, and overcomes this by dosing polyols such as glycerol or corn syrup onto the wood fibres. As put in evidence by WO2019000103, the addition of polyols to provide sufficient tack, here up to 6%, does not interfere with bonding performances. However, a person skilled in the art will recognise that introducing such amount of water-soluble compounds can deteriorate moisture-resistance performances of the panels obtained thereof. Furthermore, WO2019000103 does not address the issue of panel release from the press.

The need and importance are increasingly felt for the development of binders utilized in the manufacturing of wood panels that avoid harmful compounds, such as formaldehyde, and do not have the identified drawbacks by which pMDI is limited, such as lack of release effect when detaching the wooden composite panel from the press metal platens.

It is object of the present invention to develop novel, bio-based, formaldehyde-free, and climate change mitigating binders that allow for the preparation of fibreboard panels, offering the simultaneous advantages of decreased pMDI dosage and no usage of designated pMDI release agents, while improving environmental sustainability of the composites made thereof.

SUMMARY OF THE INVENTION

The present invention concerns a method for producing a formaldehyde-free binder comprising the following steps:

- a. preparing a slurry through the substeps consisting of:
  - a1. comminuting an untreated biological material to obtain a paste of comminuted untreated biological material;
  - a2. adding a medium to the paste of step a1. to form a slurry;

wherein
  - when the biological material of step a. comprises at least 20% lipids on dry weight, said medium of step a2. is an aqueous medium; and
  - when the biological material of step a. comprises less than 20% lipids and at least 5% protein on dry weight, said medium of step a2. is an oil;
- b. providing the slurry of step a. and a reactive formaldehyde-free prepolymer, for obtaining the formaldehyde-free binder.

In a further aspect, the invention concerns a bio-based formaldehyde-free binder obtainable by a method, comprising the following steps:

- a. preparing a slurry through the sub-steps consisting of:
  - a1. comminuting an untreated biological material to obtain a paste of comminuted untreated biological material;
  - a2. adding a medium to the paste of step a1. to form a slurry;

wherein
  - when the biological material of step a. comprises at least 20% lipids on dry weight, said medium of step a2. is an aqueous medium; and
  - when the biological material of step a. comprises less than 20% lipids and at least 5% protein on dry weight, said medium of step a2. is an oil;
- b. providing the slurry of step a. and a reactive formaldehyde-free prepolymer, for obtaining the formaldehyde-free binder.

In a further aspect, the invention concerns the use of the bio-based formaldehyde-free binder for mitigating the global warming potential (GWP) of the reactive formaldehyde-free prepolymer, to obtain a binder that does not result in a positive GWP equivalent footprint.

Furthermore, the invention entails a method for gluing a first article to at least a second article to obtain a glued product comprising:

- a. preparing a slurry through the sub-steps consisting of:
  - a1. comminuting an untreated biological material to obtain a paste of comminuted untreated biological material;
  - a2. adding a medium to the paste of step a1. to form a slurry;

wherein
  - when the biological material of step a. comprises at least 20% lipids on dry weight, said medium of step a2. is an aqueous medium; and
  - when the biological material of step a. comprises less than 20% lipids and at least 5% protein on dry weight, said medium of step a2. is an oil;
- b. providing the slurry of step a. and a reactive formaldehyde-free prepolymer, for obtaining the formaldehyde-free binder.

In a still further aspect, the invention regards a formaldehyde-free glued product obtainable by the method according to the present invention, wherein:

- a. the first and at least a second article are selected from the group consisting of a lignocellulosic material, a composite material containing a lignocellulosic material, a ceramic, a polymer, a fiberglass, a wood fibre, a ceramic powder, a plastic, a fabric, a glass, and a combination thereof; and
- b. The bio-based formaldehyde-free cured binder has a weight between 1% and 20% of the weight of the product.

As will be further described in the detailed description of the invention, the method of the present invention has the advantages of allowing for the preparation of a bio-based formaldehyde-free binder that does not have the drawbacks of the binders described in the prior art.

Definitions

Listed below are definitions of various terms used to describe this invention. These definitions apply to the terms as they are used throughout this specification and claims, unless otherwise limited in specific instances, either individually or as part of a larger group. Unless defined otherwise, all technical and scientific terms used herein generally have the same meaning as commonly understood by one of ordinary skill in the art to which this invention belongs.

As used herein, the term "comminution" is meant to carry out a reduction of the biological material particle size such that biological cell in which the oil and protein bodies are present is partially disrupted. Comminuted biological material is disrupted biological material which has a paste-like or a flour-like appearance, depending on the water or lipid content of the starting material.

As used herein, the term "untreated biological material" is meant to comprise a biological material that is not altered in its initial composition. Examples of possible treatments that can alter the composition (and therefore are excluded from the scope of the invention) are processes aiming at removing the majority of lipid content, such as solvent extraction, and/or addition of synthetic compounds, such as silicone, metal oxides or metal silicates. On the contrary, the biological material may undergo dehulling, cleaning, washing or similar processes prior to use, that do not alter the composition of the biological material and fall within the definition of "untreated biological material". Similarly, mechanical expelling aiming at removing oil with the purpose of adding back an oil to the biological material in a subsequent step is considered to fall within the definition of "untreated biological material As used herein, the term "formaldehyde-free binder" is a thermosetting binder free of any substantial amount of formaldehyde that can be cured by applying to the binder heat, pressure, or a mixture thereof for the production of No-Added-Formaldehyde products, selected from isocyanates or PAE or a mixture of.

As used herein, the term "lipid" (or "lipids") is a compound (or a mixture of compounds) that is insoluble in water but soluble in organic solvents such as alcohols, chloroform, and ethers. Lipids are also known as fatty acids and their derivatives, and substances related biosynthetically or functionally to these compounds such as phospholipids, sterols, monoglycerides, diglycerides and triglycerides (triacylglycerols or TAGs).

As used herein, the term "biological oil" is an oil present in oil-bearing material of biological origin and contains lipids.

As used herein, the term "oil medium" is a compound (or a mixture of compounds) that contain lipids, including waxes or any vegetable derived oil such as cottonseed oil, jatropha oil, palm oil, rapeseed oil, soybean oil, or sunflower oil or a mixture thereof.

As used herein, the term "meal" is a residual material obtained after extracting biological oil from any oil-bearing material often performed by means of mechanical expelling or applying solvent extraction to the oil-bearing material. The biological oil content in the meal obtained thereof is below 20% on dry weight (w/w).

As used herein, the term "reactive formaldehyde-free prepolymer" is a compound, material, or mixture that can react with the slurry described herein to form a polymer for binding purposes. Such prepolymers include, for example, amine-based prepolymers, amide-based prepolymers, silane-based prepolymers, latex prepolymers, epoxy-based prepolymers, and isocyanate-based prepolymers.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of +20% or +10%, including +5%, +1%, and +0.1% from the specified value, as such variations are appropriate to perform the disclosed methods.

DETAILED DESCRIPTION OF THE INVENTION

The present invention concerns a method for producing a bio-based formaldehyde-free binder comprising the following steps:

- a. preparing a slurry through the sub-steps consisting of:
  - a1. comminuting an untreated biological material to obtain a paste of comminuted untreated biological material;
  - a2. adding a medium to the paste of step a1. to form a slurry;

wherein
  - when the biological material of step a. comprises at least 20% lipids on dry weight, said medium of step a2. is an aqueous medium; and
  - when the biological material of step a. comprises less than 20% lipids and at least 5% protein on dry weight, said medium of step a2. is an oil;
- b. providing the slurry of step a. and a reactive formaldehyde-free prepolymer, for obtaining the formaldehyde-free binder.

Preferably, the biological material containing at least 20% lipids of step a. is chosen from the group consisting of an oilseed, a grain, a bean, a fruit, a root, a leaf, a stem, a stembark, a flower, an alga, a bacterium, a yeast, a fungus, a genetically engineered micro-organism, or a mixture thereof. In a more preferred aspect, the biological material contains a protein content in the range from 5% to 45%, more preferably from 10% to 30%, even more preferably from 20% to 30%.

The biological material used in the process according to the present invention has not been chemically treated, thus allowing for an environmentally friendly process which avoids further chemicals to be introduced into the environment and avoiding a further time consuming step, still maintaining the advantages of decreased prepolymer dosage and avoiding the use of dedicated release agents.

Contrary to the what is known in the art, wherein preferably specific biological fractions that are well-known for their properties as binder, such as proteins or defatted plant meals, are isolated from non-binding fractions (such as lipids and fibres) and combined with prepolymers to obtain a resin, the method of the present invention utilises the untreated biological material as a whole, including the lipid and fibre fractions inherently present. By combining an untreated biological material, such as comminuted whole oilseeds, with a prepolymer, such as pMDI or PAE, a binder overcoming all shortcomings identified in the prior art can be obtained. In particular, it has been surprisingly found that the utilization of untreated biological material in combination with prepolymers results in a binder that not only allows to manufacture wood composites conform with industrial requirements but also solves the technical problem of lack of composite release from the metal press platens without any further additivation, such as dedicated panel release agents.

Therefore, the present invention provides a rather simple method to obtain a binder combining a slurry obtained by comminuting whole oilseeds and a prepolymer, such as an isocyanate, for the manufacturing of fibreboard panels.

Even more surprisingly, it has been found that the slurry can reduce pMDI dosage otherwise utilised to manufacture EN-312 P2 as well as moisture resistant P3 type fibreboards without compromising product quality nor productivity of the fibreboard mill. Another advantage of the invention is that more biomass is made available, from otherwise challenging to valorise inedible oilseeds, to produce highly requested NAF binders, while mitigating the GWP of isocyanate or PAE usage in the manufacturing process of fibreboard panels.

The method as described in the present invention allows for the preparation of a bio-based NAF binder that advantageously does not present the drawbacks of those described up to now and prepared with pMDI or PAE.

In a preferred aspect, the biological material is an oilseed, such as soybean, sunflower seeds, hemp seeds, peanuts or mixtures thereof.

The usage of biological fractions in industrial applications can put pressure on food security and, more particular, on the amount of arable land available to provide for such bio-based binders. Therefore, to make a beneficial transition towards bio-based binders, it is paramount to avoid any negative impact on food security while concurrently not increasing the pressure on evermore-scarce available arable land, as recognized by the UNCCD.

In a preferred aspect, the biological material is an inedible oilseed, even more preferably the inedible oilseed of the described method is a *Jatropha curcas* seed, a Castor seed, a Cotton seed, a Jojoba seed, a Mahua seed, a Neem seed, a Pongamia seed, or a mixture thereof. More preferably the inedible oilseeds of the described method are *Jatropha curcas* seeds.

*Jatropha curcas* (*J. curcas*) is an inedible drought resilient crop well known for its biofuels production, soil restoration in semi-arid areas and carbon sequestration potential. Baumert (2014) teaches that undomesticated varieties of *J. curcas*, cultivated in semi-arid areas while applying intercrop management intervention systems, that yield 1 ton of *J. curcas* oilseed per hectare per year, have a total carbon sink of about 4 kg $CO_2$ equivalent per kg of *J. curcas* seeds. Recent developments towards domesticated varieties, hence genetically improved *J. curcas* plants that yield more biomass per cultivated area, accompanied by Sustainable Land Management (SLM) measures are means to further extent the carbon sink potential of *J. curcas*. Therefore, the cultivation of *J. curcas* in semi-arid areas is considered a means to mitigate climate change, a mitigation strategy that can be exploited even more when utilising *J. curcas* oilseeds in bio-based binders that are otherwise derived from edible crops utilising arable land.

*J. curcas* oilseeds are often processed by means of conventional mechanical expellers yielding oil and a press-cake that primarily consists of shells, protein and residual oil. In the past, projects related to the cultivation of *J. curcas* on industrial scale were often abandoned due to limited industrial applications for its oil co-product fractions, i.e. protein-rich press-cake due to the presence of antinutritional factors. Ever since, significant research has been put on upgrading the nutritional aspects of recoverable *J. curcas* oilseed fractions and exploring valorisation routes for each constituent fraction separately, i.e. the oil-, protein-, (hemi)cellulose, and lignocellulosic fraction, by applying different oilseed processing methods.

Besides the use of conventional mechanical expellers, organic solvents for processing deshelled *J. curcas* seeds, i.e. only the seeds kernel, are also used to recover oil and a co-product known as a defatted oilseed meal. However, utilising such a method presents several drawbacks related to safety concerns regarding flammability and inherently not being environmentally friendly.

The method of the present invention avoids the above indicated drawbacks by producing a binder that does provide release of the panel from the metal platens while valorising a crop that can grow under marginal circumstances. The usage of *J. curcas* is a very valid alternative to the usage of edible crops that have more noble destinations, such as human and animal nutrition.

It is worth underlining that the method of the present invention uses an oil rich biological material obtained from *J. curcas* seeds in combination with isocyanates and/or PAE to produce fibreboard panels.

The utilisation of oil rich biological material is particularly advantageous when manufacturing fibreboard panels.

Specific preferred embodiments of the present invention provide for the use of inedible oilseeds, and in particular a slurry obtained therefrom, in combination with isocyanates and/or PAE to manufacture fibreboard panels.

Such a method has not been disclosed up to now and the available prior art shows some technical shortcomings such that the solution provided does not address all challenges when utilising pMDI and/or PAE in the manufacturing of fibreboards.

In a preferred embodiment, in the method of the invention, the oilseeds are partially dehulled prior to crushing removing at least 10% of the seed hulls.

In a preferred embodiment, the reactive prepolymer is added to the biological material prior, during, or after comminuting the biological material.

In a preferred embodiment, in the method of the invention, the medium, such as water, is added to the biological material prior, during, or after comminuting the biological material according to a ratio ranging from 1:10 to 10:1, preferably from 1:5 to 5:1, more preferably from 1:3 to 3:1.

When a biological material comprises less than 20% lipids and said medium of step a2. is an oil, water can be optionally added to the slurry.

Advantageously, in the disclosed method, the binder not only allows to avoid adverse effects of the presence of indoor formaldehyde, but it also provides benefits in mitigating climate adversities while avoiding the drawbacks of methods that use pMDI or PAE.

The lipid content of the biological material of step a. can be measured, for example with a Soxhlet extractor.

In a more preferred aspect the pH of the slurry ranges from about 2 to about 10 by adding a compound selected from an acid, a base, or a mixture thereof to the slurry of step a. Preferably said acid is citric acid, hydrochloric acid, sulfuric acid, phosphoric acid, or a mixture thereof, said base is sodium hydroxide, magnesium hydroxide, calcium hydroxide, lime, urea, guanidine or a mixture thereof.

In a still more preferred aspect, a viscosity and/or a defoaming agent might be added to the slurry of step a. Preferably said viscosity agent is sodium-meta-bisulphite (SMBS) and the defoaming agent is a non-ionic surfactant such as alcohol ethoxylate/propoxylate, a fatty acid ethoxylate, or a mixture thereof.

The oilseeds used in the method of the invention are preferably comminuted into a paste of comminuted biological material of which more than 50% of the particles have a particle diameter of less than 200 μm, more preferably particles having a particle diameter larger than 300 μm are removed from the slurry prior to be used as a formaldehyde-free thermosetting binder.

In the method according to the present invention, there is an additional step of lipid removal from the slurry before the mixing step b. When the biological material has a high content of lipids, the removal of excess lipids from the slurry can be performed by the person of skill in the art with many techniques, one of which is decanting. The excess lipids that are preferably removed from the slurry are such that the final lipid content of the slurry on dry weight is in the range from 20% to about 80% with respect to the weight of the biological material, more preferably from 20% to about 65% lipid content and even more preferably from 20% to about 55% lipid content. However, some embodiments allow for an addition of lipid to achieve a lipid content of the biological material of about 30%.

In a further preferred aspect of the method, in step b., the slurry and the reactive formaldehyde-free prepolymer are fed separately to an in-line dynamic mixer prior to spraying the binder obtained thereof to a substrate of an article.

In the method of the present invention, the reactive formaldehyde-free prepolymer is selected from a polyisocyanate-based prepolymer, an epoxy-based prepolymer, a latex-based prepolymer, an amine-based prepolymer, an amide-based prepolymer, a silane-based prepolymer, an ether-based prepolymer or a combination thereof.

Under a further preferred aspect, the reactive formaldehyde-free prepolymer is a polyisocyanate-based prepolymer.

In a preferred aspect, the reactive formaldehyde-free prepolymer is methylene diphenyl diisocyanate (MDI) based.

In another preferred embodiment, the reactive formaldehyde-free prepolymer is an amine-epichlorohydrin prepolymer. Among these are polyamidoamine-epichlorohydrin binders (PAE) of which their chemistry is described by H. H. Espy, "Alkaline-curing Polymeric Amine-Epichlorohydrin Resins" (1994).

To obtain a suitable slurry from oilseeds, of which the seed kernel comprises at least 15% (w/w) biological oil and more preferably at least 20% (w/w) biological oil, the oilseeds are preferably first cleaned from any non-seed impurities and dust. Depending on the shell hardness of the oilseeds, deshelling can be optionally applied to remove at least 10% of the seed shells, more preferably at least 20% of its seed shells and even more preferably at least 35% of its seed shells. The cleaned seeds, here optionally partially deshelled, are then comminuted by a 30 kW hammer crusher operating at 3100 RPM of which the grid has holes having a diameter of 5 mm, more preferably a diameter of 3 mm and even more preferably a diameter of 1.5 mm. The temperature of the crusher is controlled during crushing by controlling the flow rate into the crusher or cooling the crusher such that the obtained paste has a temperature of no more than 85 degrees Celsius, preferably no more than 80 degrees Celsius and even more preferably no more than 75 degrees Celsius. Water can be added to the seeds prior, during, and after crushing the seeds in a ratio ranging from 1:10 to 10:1, more preferably from 1:5 to 5:1 and even more preferably from 1:3 to 3:1. Optionally the crushing step can be repeated by passing the obtained slurry through another grinding step such to obtain a homogeneous slurry of which 50% of the particles present in the slurry are smaller than 200 microns, preferably smaller than 125 microns and even more preferably smaller than 50 microns.

The slurry can be mixed, and thus used as a two-components binder system, with a thermosetting reactive prepolymer, such as isocyanate-based prepolymers, amine-epichlorohydrin prepolymers, or a mixture thereof. Preferably isocyanate-based prepolymers are used to be blended with the slurry, more preferably polyisocyanate (or monomeric diisocyanate) is used that has not reacted with another compound. Even more preferably the polyisocyanate is a methylene diphenyl isocyanate (MDI series polyisocyanates) such as, but not limited to, polymeric methylene diphenyl diisocyanate (pMDI). An example of a pMDI available on industrial scale and suitable to be mixed with the slurry can have high contents of 4,4'-methylenediphenyl diisocyanate in which low amounts of the 2,4-methylenediphenyl diisocyanate are present.

In a further preferred aspect, after or before step b. the method of the present invention provides for additional steps of adding additives, excipients and further substances to benefit homogenisation of the binder as disclosed in the invention. Furthermore, after or before step b. the method provides for an additional step of partial lipid removal from the slurry before the mixing step b.

In a further aspect, the invention concerns a formaldehyde-free binder obtainable by the method comprising the following steps:

- a. preparing a slurry through the substeps consisting of:
  - a1. comminuting an untreated biological material to obtain a paste of comminuted untreated biological material;
  - a2. adding a medium to the paste of step a1. to form a slurry;

wherein

- when the biological material of step a. comprises at least 20% lipids on dry weight, said medium of step a2. is an aqueous medium; and
  - when the biological material of step a. comprises less than 20% lipids and at least 5% protein on dry weight, said medium of step a2. is an oil;
- b. providing the slurry of step a. and a reactive formaldehyde-free prepolymer, for obtaining the formaldehyde-free binder.

Preferably, the formaldehyde-free binder obtainable by the method according to the present invention, comprises on dry weight:

- a. from about 5% to about 95% (w/w) of the slurry; and
- b. from about 5% to about 95% (w/w) of the reactive formaldehyde-free prepolymer.

In a further aspect, the invention concerns the use of the bio-based formaldehyde-free binder for mitigating the global warming potential (GWP) of the reactive formaldehyde-free prepolymer, to obtain a binder that does not result in a positive GWP equivalent footprint.

The slurry is composed of fractions present in the oilseed primarily being lipids carbohydrates, protein, and traces of lignocellulosic matter. In certain embodiments the slurry has a composition that consists of, on dry weight, lipids from 20% to about 80% (w/w), carbohydrates from about 5% to about 45% (w/w), protein from about 5% to about 45% (w/w), and lignocellulosic matter from about 1% to about 35% (w/w) with respect to the total weight of the slurry. The slurry composition can be present in an aqueous medium where water is present ranging from about 45% to about 65% (w/w). The slurry has a pH in the range of about 2 to about 10 and is a fluid that becomes a solid upon curing.

The invention also provides for a two-components binder system in which the slurry is mixed with pMDI and/or PAE. The amount of slurry on dry matter in such two-components binder system upon curing is from about 1% to about 99% (w/w), from about 10% to about 90% (w/w), and from about 15% to about 85% (w/w). Mixing can be accomplished using conventional mixers such as in-line static mixers, paddle mixers, in-line high shear pumps, and other mixers known in the art of mixing binders. Furthermore, the invention regards a method for gluing a first article to at least a second article to obtain a glued product comprising:

- a. applying the binder of the invention over the surface of the first article to obtain a binding surface;
- b. contacting the binding surface of the first article with a surface of at least a second article;
- c. curing the binder.

Preferably the binder of step b. is cured by applying pressure, heat or a combination thereof.

In a preferred aspect the first and at least second articles are each independently a material chosen from the group consisting of: a lignocellulosic material, a composite material containing a lignocellulosic material, a metal, a ceramic, a polymer, a paper, a wood, a fiberglass, a wood fibre, a ceramic powder, a plastic, a fabric and a glass, and a combination thereof.

The binder composition described herein is applicable in the manufacturing of many types of articles by bonding together many different types of substrates. For fibreboards, this entails that the binder composition is distributed over the surface of a fibre such that this fibre can form a binding surface to be put into contact with another fibre and thereby to bond the fibres together. Pressure and heat are applied to the fibres permitting the adhesive composition to cure resulting in a composite referred to as fibreboard. The binder can be applied to the fibres through conventional application methods such as spraying, pouring, roll-coating, brushing and the like. A skilled person in the art can allow the binder to be applied by different methods by adjusting the viscosity of the binder simply by controlling the amount of water present in the binder. Lower viscosity values are known to be preferred when spraying binders onto lignocellulosic fibres, for example for the manufacturing of particleboard, while higher viscosity values are known to be preferred when roll-coating binders onto lignocellulosic veneers as such for plywood manufacturing.

Besides the article being lignocellulosic fibres other composites can be generated by applying the same method consisting of fibreglass, ceramic, plastic, cloth, glass, metal, polymeric foams, fibrous materials, and combinations thereof.

In the particular case of manufacturing lignocellulosic panels, for example plywood, particleboard, high density fibreboard, medium density fibreboard, oriented strand board the amount of binder present after curing in the panel may be in the range of from about 1% to about 10% (w/w) in terms of dry-weight mass of the panel. The amount of binder strictly depends on the required characteristics of the final panel to be manufactured. A panel being less susceptible to performance degradation due to the presence of humidity, hence less swelling, might require a higher dosage binder compared to panels with less stringent humidity-resistance requirements.

In a still further aspect, the invention regards a formaldehyde-free glued product obtainable by the method according to the present invention, wherein:

a. the first and at least second articles are selected from the group consisting of a lignocellulosic material, a composite material containing a lignocellulosic material, a ceramic, a polymer, a fiberglass, a wood fibre, a ceramic powder, a plastic, a fabric and a glass, or a combination thereof; and
b. The formaldehyde-free cured binder has a weight between 1% and 10% of the weight of the product.

In a more preferred aspect, the formaldehyde-free product according to the present invention comprises an isocyanate-based compound, an amine-based compound, or a mixture thereof.

In a still more preferred aspect, the lignocellulosic material or the composite material containing lignocellulosic material of the formaldehyde-free product are chosen from the group consisting of plywood, oriented strand board, particleboard, medium-density fibreboard, or high-density fibreboard.

EXAMPLES

Reference is now made to the following examples, which together with the above descriptions illustrate some embodiments of the invention.

Particleboard Prepared from Binders on Lab Scale

Unless specified differently, the particleboard sample density was targeted at 680 kg/m3 having the dimensions 500×500×18 mm. A mixture of fibres from recycled origin was used, having a moisture content of about 2%, with a face to core ratio of 35/65. For each sample the following procedure was applied: weigh the fibres for the face layer to the nearest gram and load the fibres into a rotary blender. Weigh the binder such that the required amount of binder is dosed onto the fibres used for the face-layers of the particleboard. Continue mixing the fibres with the binder, after having sprayed or poured the desired amount of binder, for at least 4 minutes to ensure that the binder has been distributed evenly onto the fibres. Remove the resinated fibres and place it in a clean container. Repeat the same process for the core layer fibres. For both resinated fibres, being for the core as well as for the face layer, take samples for humidity analysis to calculate the overall mat humidity. Spread half the amount of resinated surface layer fibres into a forming box that has been put onto a metal plate covered by an aluminium foil, having at least the surface area of the sample dimensions ought to be obtained. Take care in evenly distributing the fibres onto the metal plate to avoid any issues regarding density distribution in the particleboard sample. Evenly distribute all the core layer fibres onto the previously assembled face layer and complete the procedure by evenly distributing the remaining face layer fibres. Use a panel having slightly smaller dimensions than the forming box to press down manually the formed mat and hold firmly for 10 seconds. Remove the forming box while keeping the pressure on the panel to expose the mat. Remove the panel, put another piece of release paper (aluminium foil) and apply another metal plate on top of the formed mat. Place the formed mat onto the loading area of the press and place support metal bars on the side of the mat having the desired thickness of the panel to be obtained. Verify the pressing temperature at the surface of the hotplates being 200 degrees Celsius. Close the press immediately after loading and start the press cycle. The press cycle applies a pressure to the mat to obtain and maintain the desired composite thickness utilising a pressfactor of 7 sec/mm. Upon completion of the press cycle remove the panel from the press, remove the metal plates and release papers, store the manufactured samples in an environmentally controlled room and cut and test specimen according to EN-312 P2 and EN-312 P3 requirements.

Example 1: Preparation of Slurries Obtained from Untreated Biological Material Utilising Soybeans, Castor Seeds (*Ricinus communis*) and *J. curcas* seeds (*Jatropha curcas*)

1.1 Aqueous Medium 500 kg of *J. curcas* seeds (origin Ghana harvested in 2017) and 500 kg of Castor seeds (origin Israel harvested in 2016) were partially deshelled, of which the product compositions are given in Table 1 below. Soybeans were not dehulled.

TABLE 1

| Seeds | Fraction | Humidity | Lipids | Protein | Other |
|---|---|---|---|---|---|
| Soybeans | Whole bean | 12.0% | 20.1% | 35.9% | 32.0% |
| Castor | Kernel + Shells | 5.1% | 43.5% | 20.8% | 30.6% |
| *J. Curcas* | Kernel + Shells | 5.5% | 40.4% | 20.1% | 34% |

Table 1: Composition of Untreated Biological Material

The untreated biological materials were separately comminuted by a modified olive mill hammer crusher utilising a grid having holes of 1.5 mm in diameter. For Castor and Jatropha a paste-like consistency was obtained having a temperature material exiting the crusher in the range of 60-70 degrees Celsius. For Soybean a flour was obtained. The obtained comminuted materials were mixed with water and passed through a screener removing any particles larger than 300 microns. Water was added to the comminuted material such that the slurries obtained after the screener have a solid content of 30%. To facilitate the screening process, a defoamer and/or a viscosity agent can be added to the slurry to increase the throughput of the removing husk residuals step. The compositions of the slurries collected after elimination of particles larger than 300 microns are given in Table 2 below.

TABLE 2

| | | slurry composition | | | |
|---|---|---|---|---|---|
| Sample | Oilseed | Lipids (%) | Protein (%) | Sugars (%) | Other (%) |
| S1 | Soybean | 24.11% | 41.02% | 8.03% | 26.84% |
| S2 | Castor | 47.12% | 28.43% | 1.42% | 23.03% |
| S3 | *J. curcas* | 44.02% | 22.63% | 2.45% | 30.90% |

Table 2: Slurry Composition on a Dry Matter Basis

Example 2: Preparation of pH Modified Slurry Derived from *J. curcas* Oilseeds

A 200 grams sample was taken from the *J. curcas* derived slurry with the composition as given in table 2. Onto this slurry citric acid can be dosed to obtain a pH of 2.8 while keeping the mixture under agitation for 30 minutes at 60 degrees Celsius. Afterwards sodium hydroxide (30%) can be added to obtain a pH of 8. The obtained mixture was agitated vigorously with a lab mixer to homogenise the slurry. pMDI was mixed with the pH- and viscosity altered slurry according to the ratio 2:1 and 1:3.3 for the core- and face layers respectively of a three-layer particleboard. The obtained binder thereof was utilized to manufacture particleboard P4 on lab-scale.

Example 3: Particleboard Preparation from Slurries with pMDI 3.1 Aqueous Medium

Particleboards were manufactured according to the described particleboard manufacturing method. For each panel, the pMDI was pre-mixed with the slurry and dosed as a homogeneous mixture onto the wood fibres till the desired dosage of binder solids was obtained. The dosage percentage represents the amount of binder in the particleboard layer on dry weight upon curing. The moisture content of the resinated fibres was adjusted to 4.5% and 14.5% for the core- and face layer respectively by means of adding water. The binder compositions utilised and their relative dosage onto the wood fibres are given in table 3 below. Reference panels (P5) were made utilising only pMDI in the core and the face layer of the particleboard.

TABLE 3

| | | CORE | | | FACE | | |
|---|---|---|---|---|---|---|---|
| PANELS | SLURRY | Dosage | pMDI | Slurry | Dosage | pMDI | Slurry |
| P1 | S1 | 3.6% | 2.4% | 1.2% | 7.5% | 1.75% | 5.75% |
| P2 | S2 | 3.6% | 2.4% | 1.2% | 7.5% | 1.75% | 5.75% |
| P3 | S3 | 3.6% | 2.4% | 1.2% | 7.5% | 1.75% | 5.75% |
| P4 | S3 pH 8 | 3.6% | 2.4% | 1.2% | 7.5% | 1.75% | 5.75% |
| P5 | — | 2.4% | 2.4% | 0.0% | 1.75% | 1.75% | 0.0% |
| P6 | Defatted Jatropha | 3.6% | 2.4% | 1.2% | 7.5% | 1.75% | 5.75% |

Table 3: Binder Dosages for Core Layer and Face Layers (Dry Matter).

For panels P1, P2, P3 and P4, the aluminium foil can be easily detached from the panel. On the other hand, when manufacturing panel P5, the aluminium foil remained strongly attached to the panel. An additional panel (P6) has been manufactured by utilizing a defatted Jatropha meal mixed with water so to obtain the same solid content, in substitution of the slurry. Also in this case, it was observed that the aluminium foil remained strongly attached to the panel.

Samples were cut and tested accordingly after stabilization of the panels. Results of these tests are given in Table 4 below.

TABLE 4

| | RAW Density | Thickness | Thickness swelling | | Internal bond | Surface soundness |
|---|---|---|---|---|---|---|
| Panel # | EN-323 kg/m3 | EN-323 mm | EN-317 % (2 h) | EN-317 % (24 h) | EN-319 MPa | EN-311 MPa |
| P1 | 676 | 18.04 | 7.40% | 14.50% | 0.45 | 1.21 |
| P2 | 681 | 18.03 | 6.50% | 16.24% | 0.47 | 1.18 |
| P3 | 673 | 17.96 | 6.13% | 17.98% | 0.46 | 1.09 |
| P4 | 688 | 18.07 | 8.01% | 11.40% | 0.49 | 1.14 |
| P5 | 680 | 17.99 | 7.81% | 15.42% | 0.34 | 0.81 |

Table 4: pMDI Based Panel Performances According to EN-312 Testing Requirements

From the prepared panels it is evident that when utilising an oilseed derived slurry in combination with pMDI (P1, P2, P3 and P4) performances were improved and class EN312 moisture-resistant panels were obtained. Also, pH modification of the slurry improves bonding performances and can therefore allow for a lower required consumption of the binder to comply with product requirements.

Example 4: Particleboard Face Layers Preparation from Slurries with PAE

Particleboards were manufactured according to the described particleboard manufacturing method. For each panel only pMDI was utilised in the core, utilising an excessive amount of 4%, while for the face layers different biomaterials were used in combination with PAE, having a solid content of 25%, dosing a total of 6% binder solids onto the surface furnish. The biomaterials used were an untreated soy flour obtained through cryogenic milling whole soybeans into a flour ($D_{50}$=150 microns), a paste obtained from partially decorticated crushed Jatropha seeds ($D_{50}$=250 microns) and a soy flour that is commercially available under the name Prolia™ ($D_{50}$=65 microns, about 50% protein content, less than 1% lipid content). Prior to dispersing the Prolia flour, Soybean oil was added and mixed with the flour to obtain a protein to oil ratio of 1.8:1 such to match the protein to oil ratio of the untreated Soybean flour. The untreated Soybean flour, Jatropha paste, and the Prolia+Soybean oil mixture were dispersed in tap water till a viscosity was obtained of 500 cps, all in the presence of Sodium-meta-bisulphite (SMBS) as viscosity agent and a defoamer being 1 part and 0.5 part added to 100 parts of biomaterial solids respectively. The achieved concentrations of the final dispersions are given in table 5 below.

TABLE 5

| Slurries | Main ingredients | SC % | Viscosity (cps) |
|---|---|---|---|
| S4 | Untreat. Soybean flour | 27.9% | 480 |
| S5 | Untreat. *Jatropha* paste | 27.4% | 540 |
| | Prolia + Soybean oil | 27.1% | 520 |

Table 5: Slurries and Prolia Plus Oil Viscosities

The obtained dispersions were mixed with PAE according to a ratio dispersion:PAE such that the final moisture content of the surface fibres did not exceed 15% while dosing a fixed 1.75% PAE on the fibres (dry weight). The final solid content and compositions of the binders are given in table 6A below.

TABLE 6A

| Panel | Slurry | Face Dosage | PAE | Slurries |
|---|---|---|---|---|
| P7 | S4 | 6.0% | 1.75% | 4.25% |
| P8 | S5 | 6.0% | 1.75% | 4.25% |
| P9 | Prolia plus oil | 6.0% | 1.75% | 4.25% |
| P10 | — | 1.75% | 1.75% | — |

Table 6A: Binder Dosages for Face Layer Layers (Dry Matter).

The binders obtained by utilising Soybean (P7), Jatropha (P8) and Prolia plus Oil (P9) in combination with PAE were dosed onto the fine surface fibres. The assembled matrasses were pressed at 200° C. using a press-factor of 7 sec/mm. Mechanical composite performance, here surface soundness in accordance with EN-311, was analysed upon stabilisation of the panel. Outcomes of tests are summarised in the Table 6B and compared to utilising PAE alone (P10).

TABLE 6B

| Panel # | Surface soundness EN-311 MPa |
|---|---|
| P7 | 1.00 |
| P8 | 0.91 |
| P9 | 0.88 |
| P10 | 0.65 |

Table 6B: Performances According to EN-312 Testing Requirements

Surprisingly it was discovered that utilising the untreated Soybean flour (P7) provides for comparable bonding performances compared to the highly refined soy flour Prolia (P9). Without intending to be limited to theory, the inventors believe that the untreated biological material presents a protein fraction that is more reactive compared to refined soy flour that favours the creation of a more rigid crosslinked binder network providing stronger and more resilient bonds when normalising to the protein content of the refined soy flour Prolia.

Example 5: Addition of Silicone to Binder

Particleboards (P11 and P12) were manufactured according to the described particleboard manufacturing method in example 4 with the addition of silicone to the binders used for the manufacturing of P7 and P8. Silicone was added at a 1% dosage onto the wood fibres on dry matter. Results are shown in Table 7 below.

TABLE 7

| Panel # | Surface soundness EN-311 MPa |
|---|---|
| P7 | 1.00 |
| P8 | 0.91 |
| P11 | 0.77 |
| P12 | 0.75 |

Table 7: Performances According to EN-312 Testing Requirements

As it can be seen, the additivation of silicone to the binders, comprising untreated biological materials and PAE, results in a deterioration of bonding performances, making additivation unnecessary.

Example 6: Industrially Manufactured Particleboards by Utilising pMDI and Untreated Whole Soybeans 5.1 Oil Medium About 725 kg of untreated whole soybeans were crushed into a flour that was afterwards diluted with about 575 kg of Jatropha oil to obtain a slurry. The slurry was passed through a 10 kW hammer crusher to obtain a homogeneous slurry. The slurry was then dispersed into water, in the presence of 1 part SMBS and 0.5 parts defoamer per 100 parts of crushed whole soybean flour, to obtain a concentration of 40% utilising a high shear mixer. Afterwards the mixture was pumped to an in-line dynamic mixer to be mixed with commercially available pMDI. The in-line dynamic mixer set-up was utilized for mixing the slurry with pMDI for the core—as well as for the face layers of the particleboard and its dosages are given in table 8 below.

TABLE 8

| CORE | | | FACE | | |
|---|---|---|---|---|---|
| Dosage | pMDI | Slurry | Dosage | pMDI | Slurry |
| 3.5% | 2.0% | 1.0% | 6.0% | 1.5% | 4.5% |

Table 8: Dosage of pMDI and Slurry onto the Wood Fibres for the Core and Face Layers of a Particleboard Panel.

Upon resinating the wood fibres, the moisture content was adjusted to 14.5% for the face layer through dosing additional water. Multiple press-factors were applied, respectively 9, 7, and 5 seconds per millimetre, of which its impact on panel performances are given in table 9 below.

TABLE 9

| Press factor sec/mm | RAW Density EN-323 kg/m3 | Thickness EN-323 mm | Thickness swelling EN-317 % (2 h) | Thickness swelling EN-317 % (24 h) | Internal bond EN-319 MPa | Surface soundness EN-311 MPa |
|---|---|---|---|---|---|---|
| 9 | 686 | 18.02 | 7.48% | 16.58% | 0.41 | 1.11 |
| 7 | 681 | 18.03 | 7.96% | 17.44% | 0.39 | 1.08 |
| 5 | 679 | 18.07 | 8.31% | 19.28% | 0.36 | 1.09 |

Table 9: Particleboard Characteristics According to EN-312 Requirement Testing Procedures at Different Press-Factors.

No press built-up was observed without the usage of dedicated pMDI release agents while running continuous production for more than six hours.

REFERENCES

1. CARB (2007)—Airborne Toxic Control Measure to Reduce Formaldehyde Emissions from Composite Wood Products https://ww3.arb.ca.gov/regact/2007/compwood07/frofinal.pdf?_ga=2.90713882.1082449153.1562761880-1534676479.1562761880
2. EuCIA (2015)—the 6th Adaptation to Technical Progress (ATP) to the classification, labelling and packaging of substances and mixtures (CLP) Regulation on 6 Jun. 2014 (Regulation 605/2014) https://eucia.eu/userfiles/files/20150107_New%20labelling%20for%20formaldehyde%20and%20styrene.pdf
3. PlasticsEurope (2012)—Eco-profiles and Environmental Product Declarations of the European Plastics Manufactures—Toluene Diisocyanate (TDI) & Methylenediphenyl Diisocyanate (MDI) ISOPA https://www.isopa.org/media/2609/eco-profile-mdi-tdi.pdf
4. Baumert (2014)—Life cycle assessment of carbon and energy balances in Jatropha production systems of Burkina Faso https://d-nb.info/1052652662/34
5. Espy, H. H., "Alkaline-curing polymeric amine-epichlorohydrin resins," in L. L. Chan, Ed., Wet-Strength Resins and their Application, TAPPI Press, Atlanta, Ch. 2, 13-44 (1994).

The invention claimed is:

1. A method for producing a formaldehyde-free binder comprising the following steps:

a. preparing a slurry through the substeps consisting of:

a1. comminuting an untreated biological material to obtain a paste of comminuted untreated biological material;

a2. adding a medium to the paste of step a1. to form a slurry;

wherein when the biological material of step a. comprises at least 20% lipids on dry weight, said medium of step a2. is water, said water being added in a ratio ranging from 1:10 to 10:1; and when the biological material of step a. comprises less than 20% lipids and at least 5% protein on dry weight, said medium of step a2. is an oil;

b. providing the slurry of step a. and a reactive formaldehyde-free prepolymer, for obtaining the formaldehyde-free binder.

2. The method according to claim 1, wherein the biological material is selected from the group consisting of an oilseed, a grain, a bean, a fruit, a root, a leaf, a stem, a stembark, a flower, an alga, a bacterium, a yeast, a fungus, a genetically engineered micro-organism, and a mixture thereof.

3. The method according to claim 1, wherein the biological material is an oilseed, wherein the oilseed is an inedible oilseed selected from the group consisting of *Jatropha curcas* seed, Castor seed, Cotton seed, Jojoba seed, Mahua seed, Neem seed, Pongamia seed, and a mixture thereof or an edible oilseed selected from the group consisting of Soya, sunflower, peanut and a mixture thereof, wherein the oilseed is partially dehulled prior to comminuting, removing at least 10% of the seed hulls and wherein the medium of step a2. and the reactive formaldehyde-free prepolymer are added to the biological material prior, during, or after comminuting the biological material.

4. The method according to claim 1, wherein in step a2., the medium is added to the biological material in a ratio ranging from 1:10 to 10:1.

5. The method according to claim 1, wherein a compound selected from an acid, a base, or a mixture thereof is added to the slurry in step a. in order to achieve a pH of the slurry in the range from about 2 to about 10.

6. The method according to claim 5 wherein the acid is acetic acid, citric acid, hydrochloric acid, phosphoric acid, sulfuric acid, or a mixture thereof, and wherein the base is sodium hydroxide, magnesium hydroxide, calcium hydroxide, lime, urea, guanidine or a mixture thereof.

7. The method according to claim 1 wherein a viscosity and/or a defoaming agent is added.

8. The method according to claim 1, wherein in step a1. oilseeds are comminuted into a paste of comminuted biological material of which more than 50% of the particles have a particle diameter of less than 200 μm.

9. The method according to claim 1, wherein there is an additional step of partial lipid removal from the slurry before the mixing step b.

10. The method according to claim 1, wherein the comminuted untreated biological material of step a1. has a particle diameter of less than 300 microns and particles having a particle diameter larger than 300 μm are removed from the slurry of step a. prior to step b.

11. The method according to claim 1, wherein in step b., the slurry and the reactive formaldehyde-free prepolymer are fed separately to an in-line static mixer prior to spraying the binder obtained thereof to a substrate.

12. The method according to claim 1, wherein the reactive formaldehyde-free prepolymer is selected from a polyisocyanate-based prepolymer, an epoxy-based prepolymer, a latex-based prepolymer, an amine-based prepolymer, an amide-based prepolymer, a silane-based prepolymer, an ether-based prepolymer or a combination thereof.

13. The method of claim 12 wherein the reactive formaldehyde-free prepolymer is an isocyanate-based prepolymer.

14. The method according to claim 13, wherein the reactive formaldehyde-free prepolymer is polymeric methylene diphenyl diisocyanate (pMDI).

15. The method of claim 12 wherein the reactive formaldehyde-free prepolymer is an amine-based prepolymer.

16. The method according to claim 15, wherein the reactive formaldehyde-free prepolymer is polyamidoamine-epichlorohydrin (PAE).

* * * * *